United States Patent
Florin et al.

(10) Patent No.: US 7,894,175 B2
(45) Date of Patent: Feb. 22, 2011

(54) NON-INTRINSICALLY SAFELY SUPPLIED MEASUREMENT DEVICE

(75) Inventors: Wilhelm Florin, Duisburg (DE);
Helmut Brockhaus, Oberhausen (DE);
Juergen Lehmkuhl, Dinslaken (DE);
Wolfgang Stelz, Oberhausen (DE)

(73) Assignee: KROHNE Messtechnik GmbH & Co. KG, Duisburg (DE)

( * ) Notice: Subject to any disclaimer, the term of this patent is extended or adjusted under 35 U.S.C. 154(b) by 996 days.

(21) Appl. No.: 11/680,884

(22) Filed: Mar. 1, 2007

(65) Prior Publication Data

US 2007/0217091 A1 Sep. 20, 2007

(30) Foreign Application Priority Data

Mar. 1, 2006 (DE) ........................ 10 2006 009 827

(51) Int. Cl.
*H02H 3/22* (2006.01)
*G01F 1/00* (2006.01)

(52) U.S. Cl. ........................................ 361/111; 73/861

(58) Field of Classification Search ................. 361/111; 73/816

See application file for complete search history.

(56) References Cited

U.S. PATENT DOCUMENTS

| | | | |
|---|---|---|---|
| 4,796,159 A | | 1/1989 | Miksche |
| 6,286,373 B1* | | 9/2001 | Lister et al. ............ 73/861.355 |
| 6,472,884 B1 | | 10/2002 | Brockhaus |
| 6,556,447 B2 | | 4/2003 | Cudini et al. |
| 6,614,634 B1* | | 9/2003 | Westerfeld et al. ............ 361/62 |
| 6,705,170 B2* | | 3/2004 | Florin ...................... 73/861.12 |
| 6,994,309 B2* | | 2/2006 | Fernandez-Sein ...... 251/129.04 |
| 7,308,825 B2* | | 12/2007 | Hagg et al. ................ 73/290 V |
| 2002/0002426 A1* | | 1/2002 | Burkhard .................... 700/286 |
| 2005/0235758 A1* | | 10/2005 | Kowal et al. ............. 73/861.29 |
| 2007/0183108 A1* | | 8/2007 | Uhlenberg et al. ......... 361/91.1 |

FOREIGN PATENT DOCUMENTS

| | | |
|---|---|---|
| DE | 3711754 A1 | 10/1988 |
| DE | 19803543 A1 | 8/1999 |
| DE | 29825052 U1 | 1/2005 |

OTHER PUBLICATIONS

Machine Translation into English language equivilent of German Publication No. De 19803543.*

* cited by examiner

*Primary Examiner*—Jared J Fureman
*Assistant Examiner*—Scott Bauer
(74) *Attorney, Agent, or Firm*—Roberts Mlotkowski Safran & Cole, P.C.; David S. Safran

(57) ABSTRACT

A non-intrinsically safely supplied measurement device (1) with a connecting device (3) having an "increased safety" type of protection for connecting the measurement device (1) to a feed connection (2) in order to supply the measurement device (1) with electricity, an electronic device (4) which contains electronic components of the measurement device (1), a display device (8), a sensor (7) made with "increased safety" or "intrinsic safety" type of protection, and an output circuit (9) that is without at least the "intrinsic safety" type of protection. The electronic device (4) has an "encapsulation" type of protection, the display device (8) has an "intrinsic safety" type of protection and the display device (8), the sensor (7) and the output circuit (9) are connected to the electronic device (4) via connections having an "increased safety" type of protection.

11 Claims, 1 Drawing Sheet

NON-INTRINSICALLY SAFELY SUPPLIED MEASUREMENT DEVICE

BACKGROUND OF THE INVENTION

1. Field of the Invention

The invention relates to a non-intrinsically safely supplied measurement device with a connecting means having an "increased safety (E-xe)" type of protection for connecting the measurement device to a feed connection in order to supply the measurement device with electricity, an electronic means which contains the electronic components of the measurement device, a display means, a sensor made with "increased safety (Ex-e)" or "intrinsic safety (Ex-i)" type of protection and an output circuit that is not made with at least "intrinsic safety (Ex-i)" type of protection.

2. Description of Related Art

In the operation of an electrical device in an explosive atmosphere, the ignition danger is due to electrical sparks on the switches and electrical transitions of the measurement device. Otherwise ignition can occur on a hot surface of the measurement device. In order to be able to operate an electrical measurement device in an explosion-prone region, therefore explosion protection measures are necessary.

In Europe, explosion protection is regulated by the ATEX standard. Explosion protection for electrical devices is established in standards DIN EN 50014 to 50028 and EN 60079. The principles of explosion protection are described in standard DIN EN 50014, while the following standards describe individual types of protection. Finally, standard FIN EN 60079 describes installation of apparatus made with a certain type of protection at the site of their use.

Basically, it holds that wherever ignitable media, such as gases and vapors, occur in a high enough concentrations, and can mix with air or pure oxygen, there is the danger of explosion. These explosion-prone regions are typically found in and around plants of the chemical industry and mining facilities, but also in other regions, such as bottling plants for high-proof spirits or in grain silos.

However, basically, there are two different possibilities for counteracting explosions there, specifically so-called "primary" and "secondary" explosion protection. In this connection, "primary" explosion protection is based on the avoidance of flammable media. However, often flammable media cannot be avoided since the essence of a process or production method often lies in use of a certain flammable medium. In this case, then, measures of "secondary" explosion protection must be used, i.e., avoiding ignition sources which can ignite the explosive atmosphere.

The measures which are taken on electrical apparatus to prevent ignition of an explosive atmosphere surrounding them are divided into the above addressed types of protection. In this connection, one or more of these types of protection can be implemented to achieve the desired explosion protection.

In the initially described measurement device, a connection means made with an "increased safety (Ex-e)" type of protection for connection to a feed connection must be provided to supply the measurement device with electric power. Here, protection type "increased safety", abbreviated "Ex-e", indicates that measures are taken which reduce the probability of spark formation and elevated temperature. Thus, in normal operation, there cannot be any ignition source present. Typically, this is achieved by over-dimensioning of the parts used and by providing relatively large distances between locations between which a spark might pass.

Otherwise, in the initially described measurement device, there should be a sensor which is made, for example, in "intrinsic safety" type of protection, abbreviated "Ex-i". In this connection, the "intrinsic safety" type of protection describes measures in which the energy in the circuit is limited to values which do not allow unduly high temperatures and/or ignition sparks or arcs which have the ignition energy required for an explosion. Here, it is essential that intrinsic safety does not relate to individual equipment, but to the entire intrinsically safe circuit. This intrinsically safe circuit includes not only the connecting lines, but at least one intrinsically safe apparatus and the pertinent apparatus.

An intrinsically safe apparatus is defined as an apparatus in which, by definition, all circuits are intrinsically safe. This means that the voltage and current in the intrinsically safe circuit are so small that, in a short circuit, interruption or ground fault, no ignition can take place, i.e., the ignition energy is smaller than the minimum ignition energy for igniting the explosive environment. In contrast to the pertinent apparatus described below, intrinsically safe apparatus are suited for operation directly in the explosion-endangered area.

The pertinent apparatus within the framework of "intrinsic safety" type of protection is defined as an apparatus in which not all circuits are intrinsically safe. However, the pertinent apparatus contains at least one intrinsically safe circuit which can be routed into the explosion-endangered region. Generally therefore, in the pertinent apparatus, a non-intrinsically safe signal is converted into an intrinsically safe signal. Thus, the pertinent apparatus can be, for example, an apparatus made with a different type of protection.

For non-intrinsically safely supplied measurement devices with an electronic means containing electronic components of the measurement device, as described initially, this electronic means is often made in "explosion-proof enclosure" type of protection, abbreviated "Ex-d"; this means that the electronic means is provided with an enclosure which, in the case of ignition within the enclosure, ensures that the housing of the enclosure withstands the pressure, and transmission of the explosion within the enclosure into the exterior is precluded by the gap widths of the openings out of the enclosure having to be kept correspondingly small, i.e., for example, to implement penetrations for electric leads.

The execution of the electronic means in "explosion-proof enclosure" type of protection has a host of disadvantages. Such an enclosure makes the electronic means very heavy, otherwise there also being very little freedom with respect to shape. Explosion-proof enclosures are generally made round or spherical for reasons of stability. Moreover, due to the indicated, only small allowable gap widths, complex cable penetrations for connections of other components to the electronic means must be provided.

SUMMARY OF THE INVENTION

Thus, a primary object of the present invention is to devise a non-intrinsically safely supplied measurement device which can be produced easily and economically and can be safely operated even in an explosion-endangered region.

Proceeding from the initially described measurement device, this object is achieved in that the electronic means has an "encapsulation (Ex-m)" type of protection, the display means has an "intrinsic safety (Ex-i)" type of protection and the display means, the sensor and the output circuit are connected to the electronic means via connections with an "increased safety (Ex-e)" type of protection.

Protection type "encapsulation" is defined as embedding of the potential ignition source into a potting mass such that a dangerous explosive atmosphere cannot be ignited. Thus, the invention takes a completely new approach by the electronic means no longer needing to be made complex in a protection type "explosion-proof enclosure," but in the "encapsulation" type of protection in combination with a display means made intrinsically safe and connections made in "increased safety" type of protection. Thus, complex line penetrations are eliminated, the display means need not be provided within an explosion-proof enclosure; furthermore, this avoids providing a pressure-proof viewing window, and otherwise there is extensive freedom of shape for the configuration of the electronic means and its housing.

For implementation of the initial circuit there are various possibilities. According to one preferred development of the invention, the output circuit can be a field bus, such as a "Profibus PA" (Process Automation), or "Profibus DP" (Decentralized Periphery), here, an intrinsically safe and alternatively a non-intrinsically safe configuration being possible. (Profibus-PA and Profibus DP are two of three variants of the PROFIBUS vendor-independent, open bus system that was standardized in the German DIN 19 245 and has been embedded into the European standard EN 50170 Volume 2 without modifications.)

According to a preferred development of the invention, there are also at least two output circuits that are not made with at least "intrinsic safety" type of protection. According to a quite preferred development of the invention, there are three output circuits which are not made with at least "intrinsic safety" type of protection, specifically preferably a current output, a pulse output and a status output.

According to another preferred development of the invention, it is further provided that the display means is supplied by the electronic means. This means that the display means is supplied with electricity via the connections made with the "increased safety" type of protection of the electronic means in an intrinsically safe manner.

It was stated initially that the measurement device in accordance with the invention is non-intrinsically safe. According to a preferred development of the invention, the measurement device can be connected for this purpose to a feed connection in the form of a standard power supply line or a standard low voltage connection, such as a standard 24V connection. Therefore, it is important that for the measurement device in accordance with the invention there can be a feed connection which need not be subject to an "intrinsic safety" type of protection.

Basically, the measurement device in accordance with the invention can be embodied in a variety of different types of measurement devices. According to one preferred development of the invention, it is provided that the measurement device is a magnetic-inductive flow rate measuring device for measuring the flow rate of a flowing medium through a measurement tube, with field coils made with an "increased safety (Ex-e)" type of protection for producing a magnetic field which penetrates the flowing medium and with electrodes made with an "intrinsic safety (Ex-i)" type of protection for tapping a voltage induced in the flowing medium.

According to another preferred development of the invention, it is provided that the measurement device is an ultrasonic flow rate measurement device for measuring the flow rate of a flowing medium through a measurement tube, with ultrasonic transducers made with an "intrinsic safety (Ex-i)" type of protection for sending or receiving ultrasonic signals running through the flowing medium.

Finally, according to another preferred development of the invention, it is provided that the measurement device is a coriolis mass flow rate measurement device for measuring the flow rate of a flowing medium through a measurement tube, with at least one vibration generator for exciting the vibrations of the measurement tube, at least one vibration sensor for detecting the generated vibrations of the measurement tube, an electronic front end which is offset from the electronic means and which is supplied with an "intrinsic safety (Ex-i)" type of protection for connection to the vibration generator and the vibration sensor, and a signal line which is goes out from the electronic front end and which is likewise made with an "intrinsic safety (Ex-i)" type of protection.

It was stated beforehand that the display means, the sensor and the output circuit are connected to the electronic means via connections having an "increased safety" type of protection. In this respect, according to one preferred development of the invention, it is provided that, for this purpose, there are several connecting terminals on the electronic device, which are all located on a common side of the electronic means. These connecting terminals are each potted in areas, therefore lead to electronic means provided in the encapsulation, and project on the other side out of the encapsulation so that they are available as metallically conductive contacts.

In this connection, according to a preferred development of the invention, it is also provided that the electronic means is provided in a preferably plastic cup and this cup is potted. In this way, especially simple and economical production of the electronic means is achieved.

A preferred embodiment of the invention is explained in detail below with reference to the accompanying drawings.

DETAILED DESCRIPTION OF THE INVENTION

Figure 1:
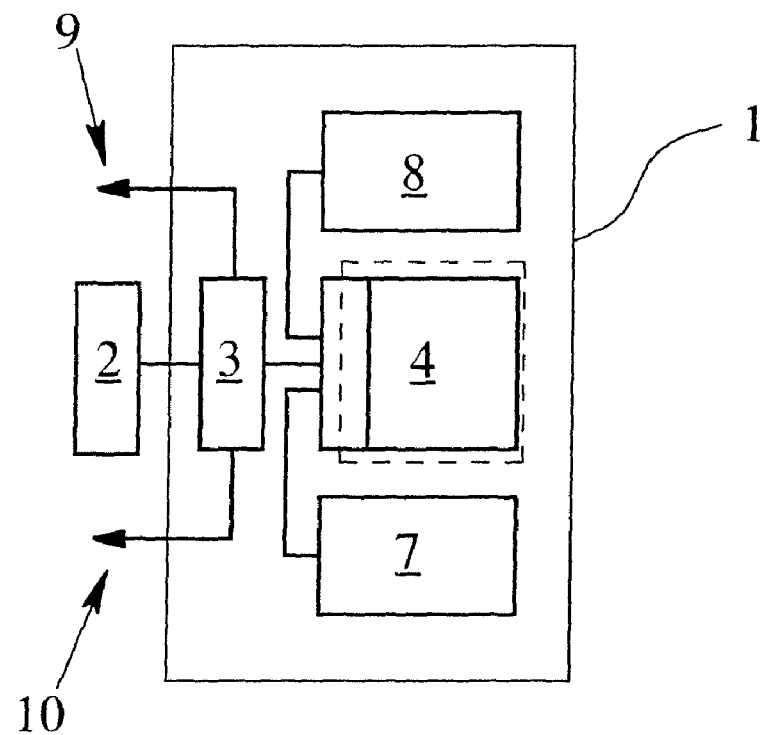
FIG. 1 schematically shows a measurement device according to a preferred embodiment of the invention and FIG. 2 shows the electronic means of the measurement device provided in a cup and potted into it according to the preferred embodiment of the invention.

FIG. 1 schematically shows a measurement device 1 according to one preferred embodiment of the invention which has a non-intrinsically safe feed connection 2. The feed connection 2 can be a standard power supply line (110V/220V) or a standard low voltage connection, such as a standard 24V connection.

To connect to the feed connection 2, the measurement device 1 has a connection means 3. This connection means 3 has the actual connecting possibilities for connecting to the feed connection 2 and ordinary I/O circuits which are not shown individually. The terminal means 3 has an "increased safety" type of protection, i.e., it is dimensioned such that ignitable sparks cannot be produced in operation of the measurement device.

The terminal means 3 is connected to an electronic means 4 which contains all electronic components of the measurement device. It is decisive here that the electronic means 4 is provided with protection type "encapsulation", i.e., it is located entirely within the potting 5. The feed lines to the electronic components of the electronic means 4 (not shown in detail) are connections 6 made with an "increased safety" type of protection and which project into the potting 5 at one side and form galvanically conductive connection possibilities on the other side.

As already disclosed, the electronic means 4 is connected to the connecting means 3 via these connections 6. Furthermore, a sensor 7 and a display device 8 are connected to the electronic means 4 via these connections 6. In this regard, the sensor 7 is made with either an "increased safety" type of protection or an "intrinsic safety" type of protection.

In the case in which the measurement device according to the preferred embodiment of the invention is a magnetic-inductive flow rate measurement device for measuring the flow rate of a flowing medium through a measurement tube, there are field coils made with an "increased safety" type of protection for producing a magnetic field which penetrates the flowing medium and electrodes made with the "intrinsic safety" type of protection for tapping a voltage induced in the flowing medium.

If the measurement device according to the preferred embodiment of the invention is an ultrasonic flow rate measurement device for measuring the flow rate of a flowing medium through a measurement tube, ultrasonic transducers provided with the "intrinsic safety" type of protection are designed for sending or receiving ultrasonic signals running through the flowing medium.

Finally, if the measurement device according to a preferred development of the invention is a coriolis mass flow rate measurement device for measuring the flow rate of a flowing medium through a measurement tube, with at least one vibration generator for exciting the vibrations of the measurement tube and at least one vibration sensor for detecting the generated vibrations of the measurement tube, in addition to the electronic means 4, there are an electronic front end which has an "intrinsic safety" type of protection for connection to the vibration generator and the vibration sensor, and a signal line which is goes out from the electronic front end and which is likewise made with an "intrinsic safety" type of protection.

In the above described measurement device according to the preferred embodiment of the invention, there are two output circuits 9, 10, neither of which have the "intrinsic safety" type of protection. The display means 8 is likewise connected to the electronic means via connections 6, the display means 8 having an "intrinsic safety" type of protection and being supplied from the electronic means 4 in an intrinsically safe manner.

Figure 2:
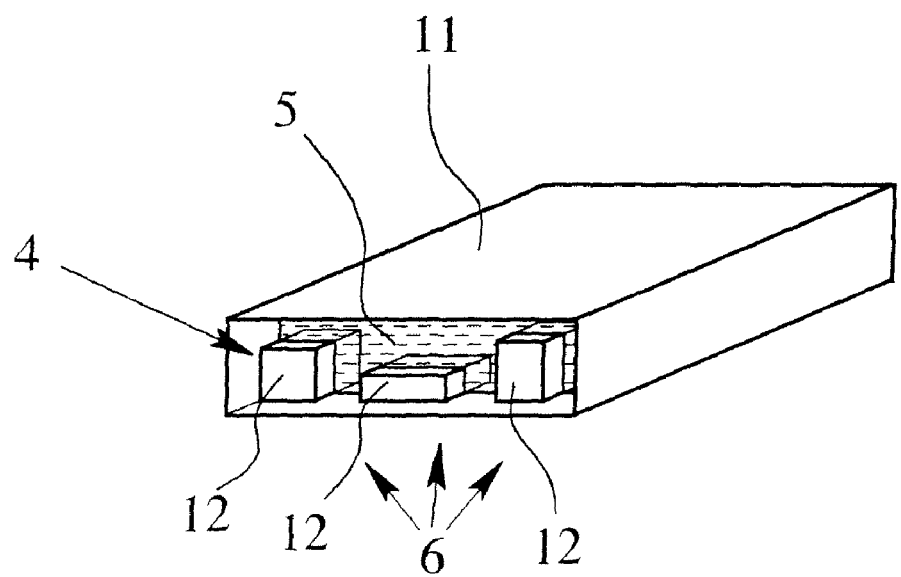

FIG. 2 is a schematic illustration of the electronic means 4 of the measurement device according to the preferred embodiment of the invention. In this connection, the electronic means 4 is located within a plastic cup 11 (cup-shaped enclosure) and is provided with potting 5. The connections 6 project out of the potting 5 and are formed by a plurality of connecting terminals 12. Thus, an especially simple version of the electronic means 4 which can be economically produced can be achieved by the arrangement of these connecting terminals 12 on the same side.

In this connection, the important advantages arise altogether due to the fact that complex line penetrations are not necessary, and the display means need not be provided within an explosion-proof enclosure. Thus, a pressure-proof viewing window is not needed, and there is extensive freedom in choosing the shape for the configuration of the electronic means and its housing.

What is claimed is:

1. Non-intrinsically safely supplied measurement device, comprising:
    a connecting means for connecting of the measurement device to a feed connection to supply the measurement device with electricity, the connecting means having an "increased safety (E-xe)" type of protection,
    an electronic means which contains electronic components of the measurement device,
    a display means,
    a sensor that is provided with one of an "increased safety (Ex-e)" and an "intrinsic safety (Ex-i)" type of protection, and
    at least one output circuit made without at least an "intrinsic safety (Ex-i)" type of protection,
    wherein the electronic means has an "encapsulation (Ex-m)" type of protection,
    wherein the display means has an "intrinsic safety (Ex-i)" type of protection, and
    wherein the display means, the sensor and the output circuit are connected to the electronic means via connections which have an "increased safety (Ex-e)" type of protection.

2. Measurement device in accordance with claim 1, wherein the output circuit is a field bus.

3. Measurement device in accordance with claim 1, wherein said at least one output circuit comprises at least two output circuits.

4. Measurement device in accordance with claim 1, wherein said at least one output circuit comprises three output circuits, the three output circuits being a current output, a pulse output and a status output.

5. Measurement device in accordance with claim 1, wherein the display means is supplied by the electronic means.

6. Measurement device in accordance with claim 1, wherein the measurement device is connectable to a feed connection which is without at least an "intrinsic safety (Ex-i)" type of protection and is in the form of a standard power supply line or a standard low voltage connection.

7. Measurement device in accordance with claim 1, wherein the measurement device is a magnetic-inductive flow rate measuring device for measuring the flow rate of a flowing medium through a measurement tube, with field coils provided for producing a magnetic field which penetrates the flowing medium that are provided with an "increased safety (Ex-e)" type of protection and with electrodes for tapping a voltage induced in the flowing medium that have an "intrinsic safety (Ex-i)" type of protection.

8. Measurement device in accordance with claim 1, wherein the measurement device is an ultrasonic flow rate measurement device for measuring the flow rate of a flowing medium through a measurement tube, with ultrasonic transducers for sending or receiving ultrasonic signals running through the flowing medium that have an "intrinsic safety (Ex-i)" type of protection.

9. Measurement device in accordance with claim 1, wherein the measurement device is a coriolis mass flow rate measurement device for measuring the flow rate of a flowing medium through a measurement tube, with at least one vibration generator for exciting vibrations in the measurement tube, at least one vibration sensor for detecting the generated vibrations of the measurement tube, an electronic front end which is offset from the electronic means for connection to the vibration generator and the vibration sensor and which has an "intrinsic safety (Ex-i)" type of protection, and a signal line which goes out from the electronic front end and which has an "intrinsic safety (Ex-i)" type of protection.

10. Measurement device in accordance with claim 1, wherein the electronic means has a plurality of connecting terminals which are all located on the same side of the electronic means.

11. Measurement device in accordance with claim 10, wherein the electronic means is potted in a plastic cup-shaped enclosure.

* * * * *